United States Patent
Xiao (10) Patent No.: US 12,304,300 B2
(45) Date of Patent: May 20, 2025

(54) CAP OPENING AND CLOSING DEVICE AND VEHICLE HAVING THE SAME

(71) Applicant: BYD COMPANY LIMITED, Guangdong (CN)

(72) Inventor: Kunhuang Xiao, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 286 days.

(21) Appl. No.: 17/976,318

(22) Filed: Oct. 28, 2022

(65) Prior Publication Data

US 2023/0060841 A1    Mar. 2, 2023

Related U.S. Application Data

(63) Continuation of application No. PCT/CN2021/089023, filed on Apr. 22, 2021.

(30) Foreign Application Priority Data

Apr. 30, 2020 (CN) .......................... 202020718710.9

(51) Int. Cl.
*B60K 15/05* (2006.01)

(52) U.S. Cl.
CPC ...... *B60K 15/05* (2013.01); *B60K 2015/0523* (2013.01); *B60K 2015/0561* (2013.01)

(58) Field of Classification Search
CPC ............ B60K 15/05; B60K 2015/0523; B60K 2015/0561
USPC ...................................................... 296/97.22
See application file for complete search history.

(56) References Cited

FOREIGN PATENT DOCUMENTS

| CN | 101548057 A | 9/2009 | |
|---|---|---|---|
| CN | 203528617 U | 4/2014 | |
| CN | 107405996 A | 11/2017 | |
| CN | 207592963 U | 7/2018 | |
| CN | 109532473 A | 3/2019 | |
| CN | 213175212 U | 5/2021 | |
| JP | 2016223150 A | 12/2016 | |
| KR | 20190107395 A | 9/2019 | |
| WO | WO-2008059543 A1 * | 5/2008 | ............. B60K 15/05 |
| WO | WO-2016139690 A1 * | 9/2016 | ............. B60K 15/05 |

OTHER PUBLICATIONS

International Search Report and Written Opinion for Application No. PCT/CN2021/089023, mailed on Jul. 19, 2021, 8 pages.

* cited by examiner

*Primary Examiner* — Mahmoud Gimie (57) ABSTRACT

A device for opening and closing a cap, includes: a mounting box; a locking pin, rotatably and retractably mounted to the mounting box, and having a locking head for hooking the cap; a guide block, mounted to the mounting box and having a guide groove; a rocker arm, rotatably mounted to the mounting box, and having a first end fitted to the locking pin and a second end fitted with a pin hole; a slidable pin, movably fitted in the pin hole along an axial direction of the pin hole; and an adjusting component, arranged on the second end of the rocker arm and abutting against the slidable pin, and configured to adjust a position of the slidable pin in the pin hole. The slidable pin is coupled with the adjusting component to fit to the guide groove and to slide along the guide groove.

20 Claims, 9 Drawing Sheets

CAP OPENING AND CLOSING DEVICE AND VEHICLE HAVING THE SAME

CROSS-REFERENCE TO RELATED APPLICATIONS

The application is a continuation application of International Patent Application No. PCT/CN2021/089023 filed with the China National Intellectual Property Administration (CNIPA) on Apr. 22, 2021, which is based on and claims priority to and benefits of Chinese Patent Application No. 202020718710.9 filed on Apr. 30, 2020. The entire content of all of the above-referenced applications is incorporated herein by reference.

FIELD

The present disclosure relates to a cap opening and closing device and a vehicle having the cap opening and closing device.

BACKGROUND

A cap opening and closing device in the related art is locked by pressing by an external force and opened by pressing it again. The cap opening and closing device mainly includes a mounting box, a rotary pin, a rocker arm, a guide block, and other components. A guide groove is arranged in the guide block, where one end of the rocker arm is fitted to the rotary pin, and the other end of the rocker arm is fitted to the guide groove. However, since the guide groove has a groove bottom with concave and convex portions, the rocker arm will sway or shift in an axial direction of an axis of rotation when the rocker arm is fitted thereto, causing ineffective rotation, extension and retraction of the rotary pin, thereby affecting the performance reliability.

SUMMARY

The present disclosure at least solves one of the technical problems in the related art. The present disclosure proposes a cap opening and closing device having a stable structure, reliable performance and other advantages.

The present disclosure also proposes a vehicle having the cap opening and closing device.

An embodiment according to a first aspect of the present disclosure discloses a cap opening and closing device, which includes: a mounting box; a locking pin, rotatably and retractably mounted to the mounting box, and having a locking head for hooking the cap; a guide block, mounted to the mounting box and having a guide groove; a rocker arm, rotatably mounted to the mounting box, and having a first end fitted to the locking pin and a second end fitted with a pin hole; a slidable pin, movably fitted in the pin hole along an axial direction of the pin hole; and an adjusting component, arranged on the second end of the rocker arm and abutting against the slidable pin, and configured to adjust a position of the slidable pin in the pin hole, wherein the slidable pin is coupled with the adjusting component to fit to the guide groove and to slide along the guide groove.

The cap opening and closing device according to the embodiment of the present disclosure has a stable structure, a reliable performance, and other advantages.

According to some embodiments of the present disclosure, the guide groove has a groove bottom with concave and convex portions, and the slidable pin is coupled with the adjusting component to fit to the groove bottom of the guide groove.

According to some embodiments of the present disclosure, the adjusting component includes a second elastic component configured to push the slidable pin toward the guide groove.

According to some embodiments of the present disclosure, the slidable pin includes a pin cap; and a pin pole, where one end of the pin pole is connected to the pin cap, the cross-sectional area of the pin pole is smaller than the cross-sectional area of the pin cap, and the other end of the pin pole is fitted to the guide groove and is slidable along the guide groove Further, the pin hole includes a step, and the pin cap abuts against the step by the push of the second elastic component.

According to some embodiments of the present disclosure, the cap opening and closing device further includes an end cover, where the end cover is mounted to the second end of the rocker arm and covers the pin hole, the second elastic component is arranged in the pin hole, and a first end of the second elastic component abuts against the end cover and a second end of the second elastic component abuts against the slidable pin.

According to some embodiments of the present disclosure, the surface of the end cover facing the second elastic component includes a positioning protrusion, and the second elastic component is a spring, where the first end of the second elastic component is mounted around the positioning protrusion.

According to some embodiments of the present disclosure, the surface of the end cover facing away from the second elastic component is provided with a first spherical surface, and a stop plate is provided in the mounting box, where the first spherical surface abuts against the stop plate.

According to some embodiments of the present disclosure, the rocker arm is an integral rigid component.

According to some embodiments of the present disclosure, the rocker arm includes a first rotating shaft and a second rotating shaft at two sides of a middle portion in the length direction, the mounting box is provided with a first shaft hole and a second shaft hole, the first rotating shaft is rotatably fitted in the first shaft hole, and the second rotating shaft is rotatably fitted in the second shaft hole.

According to some embodiments of the present disclosure, each of the end of the first rotating shaft facing away from the rocker arm and the end of the second rotating shaft facing away from the rocker arm includes a second spherical surface, where the second spherical surface of the first rotating shaft and the second spherical surface of the second rotating shaft abut against the mounting box.

According to some embodiments of the present disclosure, a first side wall of two opposite side walls of the mounting box includes a first mounting seat and a second mounting seat, and a second side wall of the two opposite side walls includes a first mounting arm and a second mounting arm. The first mounting arm and the first mounting seat together define the first shaft hole, and the second mounting arm and the second mounting seat together define the second shaft hole. The second spherical surface of the first rotating shaft abuts against the first mounting seat, and the second spherical surface of the second rotating shaft abuts against the second mounting seat.

According to some embodiments of the present disclosure, the locking pin includes: a rotary pin, rotatably and retractably mounted to the mounting box; and a first elastic component configured to push the rotary pin to extend out of the mounting box.

Further, the first end of the rocker arm includes a fork-shaped head, the fork-shaped head includes oppositely arranged guide posts, an outer peripheral surface of the rotary pin includes an annular groove extending circumferentially, and the guide posts are fitted in the annular groove.

According to some embodiments of the present disclosure, a first stopper and a second stopper are provided in the mounting box, where the fork-shaped head is located between the first stopper and the second stopper.

According to some embodiments of the present disclosure, the guide groove has a closed annular structure, where the slidable pin can slide unidirectionally along the guide groove. The guide groove includes a first ascending section, a first descending section, a second ascending section, and a second descending section connected in sequence. One end of the first ascending section is connected to one end of the first descending section, and the distance between the first ascending section and the first descending section gradually increases toward the extending-out direction of the locking pin. One end of the second ascending section is connected to the other end of the first descending section, one end of the second descending section is connected to the other end of the first ascending section, the other end of the second ascending section is connected to the other end of the second descending section, and the distance between the second ascending section and the second descending section gradually increases toward the extending direction of the locking pin.

According to some embodiments of the present disclosure, the mounting box includes: a box body, where the locking pin is rotatably and retractably mounted to the box body; and a box cover, mounted to the box body, where a first end of a first elastic component abuts against the locking pin and a second end of the first elastic component abuts against the box cover, and both the guide block and the rocker arm are mounted to the box body and the box cover.

An embodiment according to a second aspect of the present disclosure proposes a vehicle, which includes a cap, having a locking groove thereon; and a cap opening and closing device according to the embodiment in accordance with the first aspect of the present disclosure, where a locking head on a locking pin of the cap opening and closing device is fitted to the locking groove to connect the cap opening and closing device to the cap.

The vehicle according to the embodiment of the present disclosure has the advantages of reliable cap opening and closing performance by virtue of the cap opening and closing device according to the embodiment in accordance with the first aspect of the present disclosure.

According to some embodiments of the present disclosure, the cap is a fuel tank cap; and/or the cap is a charging port cap.

Additional aspects and advantages of the present disclosure will be partly given in and partly apparent from the description below, or understood through practice of the present disclosure.

BRIEF DESCRIPTION OF THE DRAWINGS

The above and/or other additional aspects and advantages of the present disclosure become apparent and comprehensible from the description of embodiments in connection with accompanying drawings.

FIG. 5 is a schematic of the cross-sectional view taken along the line A-A in

FIG. 4.

LIST OF REFERENCE NUMERALS cap opening and closing device 1,
mounting box 100, first shaft hole 101, second shaft hole 102, box body 110, first mounting seat 111, second mounting seat 112, first stopper 113, second stopper 114, guide hole 115, pin pole 116, stop plate 117, box cover 120, first mounting arm 121, second mounting arm 122, mounting post 123, support shaft hole 124,
rotary pin 200, locking head 210, annular groove 220, spiral guide groove 230, hollow hole 240, locking groove 250,
first elastic component 300,
guide block 400, guide groove 410, first ascending section 411, first descending section 412, second ascending section 413, second descending section 414, support shaft 420,
rocker arm 500, pin hole 510, step 520, first rotating shaft 530, second rotating shaft 540, second spherical surface 550, fork-shaped head 560, guide post 561,
slidable pin 600, pin cap 610, pin pole 620,
adjusting component 700,
end cover 800, positioning protrusion 810, first spherical surface 820,
motor 910, locking block 920, screw 930,
cap 2, locking groove 21, open box 3.

DETAILED DESCRIPTION

Embodiments of the present disclosure are described in detail below, and examples of the embodiments are shown in the accompanying drawings, where the same or similar elements or the elements having same or similar functions are denoted by the same or similar reference numerals throughout the description. The following embodiments described with reference to the accompanying drawings are exemplary, and are merely intended to describe the present disclosure and cannot be construed as a limitation to the present disclosure.

In the description of the present disclosure, it should be understood that orientation or position relationships indicated by the terms such as "center", "length", "width", "thickness", "top", "bottom", "inside", "outside", "axial", "radial", and "circumferential" are based on orientation or position relationships shown in the accompanying drawings, and are used only for ease and brevity of illustration and description, rather than indicating or implying that the mentioned apparatus or component need to have a particular orientation or need to be constructed and operated in a particular orientation. Therefore, such terms should not be construed as limiting of the present disclosure.

In the description of the present disclosure, "first feature", and "second feature" may include one or more of the features, "a number of" means two or more, and "several" means one or more.

A cap opening and closing device 1 according to an embodiment of the present disclosure is described with reference to accompanying drawings.

As shown in FIG. 1 to FIG. 6, the cap opening and closing device 1 according to an embodiment of the present disclosure includes a mounting box 100, a locking pin, a first elastic component 300, a guide block 400, a rocker arm 500, a slidable pin 600 and an adjusting component 700.

Figure 1:
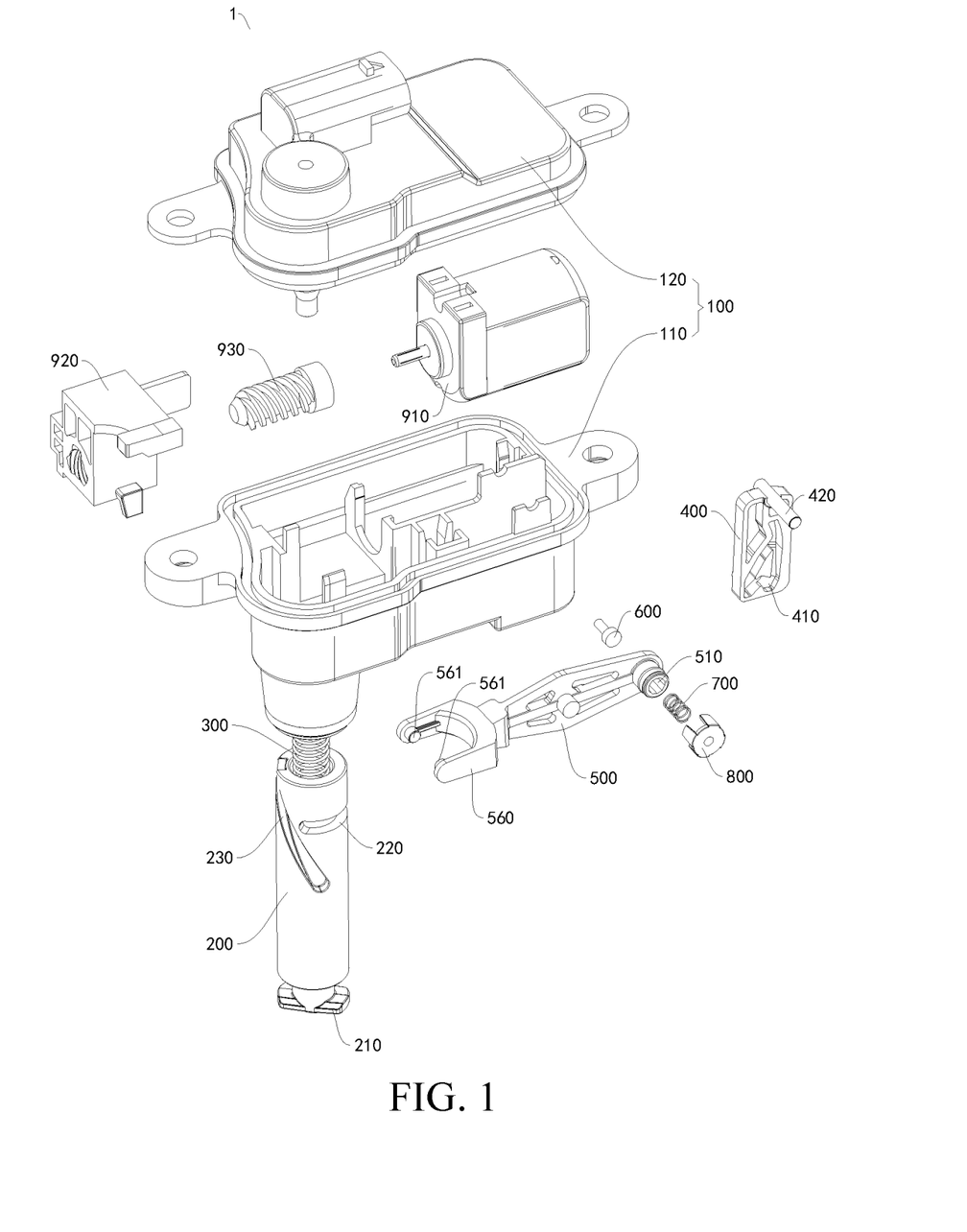
FIG. 1 is an exploded view of a cap opening and closing device according to an embodiment of the present disclosure.

The locking pin is rotatably and retractably mounted to the mounting box 100. In an embodiment, as shown in FIG. 1, The locking pin includes a rotary pin 200 and a first elastic component 300. The rotary pin 200 is rotatably and retractably mounted to the mounting box 100, and the rotary pin 200 has a locking head 210 for hooking a cap 2 at one end. The first elastic component 300 is configured to push the rotary pin 200 to extend out of the mounting box 100, and the first elastic component 300 is connected to the rotary pin 200 and the mounting box 100.

The guide block 400 is mounted to the mounting box 100, and the guide block 400 is provided with a guide groove 410. The rocker arm 500 is rotatably mounted to the mounting box 100. For example, a middle portion of the rocker arm 500 in a length direction is rotatably mounted to the mounting box 100, and an axis of rotation of the rocker arm 500 is perpendicular to the extension and retraction direction of the rotary pin 200. One end of the rocker arm 500 is fitted to the rotary pin 200, and the other end of the rocker arm 500 is provided with a pin hole 510, where an axial direction of the pin hole 510 is perpendicular to the guide groove 410 of the guide block 400. The slidable pin 600 is movably fitted in the pin hole 510 along the axial direction of the pin hole 510. The adjusting component 700 is arranged at the other end of the rocker arm 500 and abuts against the slidable pin 600. The adjusting component 700 is configured to adjust the position of the slidable pin 600 in the pin hole 510, and the slidable pin 600 is adjusted by the adjusting component 700 to fit to the guide groove 410 and to slide along the guide groove 410.

For example, the cap opening and closing device 1 may be a press type cap opening and closing device, that is, a push-push type cap opening and closing device. The locking head 210 of the rotary pin 200 may have a square structure. Correspondingly, a square locking groove 21 is provided on the cap 2 (as shown in FIG. 7 to FIG. 10). The rotary pin 200 can overcome the elastic force of the first elastic component 300 (by pressing the cap) to reach a closed position in the mounting box 100, and overcome the elastic force of the first elastic component 300 again (by pressing the cap) to move a short distance to automatically return to an open position under the elastic force of the first elastic component 300.

When the rotary pin 200 is at the open position, the locking head 210 can be withdrawn from the square groove of the cap. When the rotary pin 200 is in the closed position, the locking head 210 goes back into the square groove of the cap, and then rotated with the rotary pin 200 (usually by an angle of 90°), to form a nearly cross shape to achieve the closing and locking of the cap.

During the extension and retraction of the rotary pin 200, the one end of the rocker arm 500 is driven to move, and consequently, the slidable pin 600 in the pin hole 510 at the other end of the rocker arm 500 slides in the guide groove 410 of the guide block 400. The rocker arm 500 fitting with the guide block 400 ensures that the cap can be opened and closed when a pressure is applied to the cap, and the cap cannot be opened and closed when a pulling force is applied to the cap.

In the cap opening and closing device 1 according to the embodiment of the present disclosure, the pin hole 510 is arranged at the end of the rocker arm 500 that is fitted to the guide block 400, the slidable pin 600 that can move axially in the pin hole 510 and the adjusting component 700 configured to adjust the position of the slidable pin 600 are arranged. The slidable pin 600 is adjusted by the adjusting component 700 to persistently fit to the guide groove 410 of the guide block 400, such that even if the groove bottom of the guide groove 410 has concave and convex portions or has machining errors, the adjusting component 700 can also adjust the slidable pin 600 to a proper position, to fit the slidable pin 600 to the guide groove 410. Therefore, by adjusting the position of the slidable pin 600 by the adjusting component 700, the gap between the slidable pin 600 and the groove bottom of the guide groove 410 can be offset. Because the slidable pin 600 can move relative to the rocker arm 500, during the movement of the slidable pin 600, the rocker arm 500 will not sway or shift in an axial direction of an axis of rotation, ensuring the stability of the rocker arm 500, and ensuring that the rotary pin 200 can rotate, extend, and retract effectively.

Therefore, the cap opening and closing device 1 according to the embodiment of the present disclosure has a stable structure, reliable performance and other advantages.

It can be understood by those skilled in the art that the guide groove 410 may have a groove bottom with concave and convex portions, and the slidable pin 600 is adjusted by the adjusting component 700 to fit to the groove bottom of the guide groove 410. According to an embodiment of the present disclosure, it is also applicable in a case where the groove bottom of the guide groove 410 has no concave and convex portions, to eliminate the swaying and shift of the rocker arm 500 caused by the machining or assembly errors of other components.

In addition, it is to be understood that in some cap opening and closing devices in related art, a spring is provided at a rotation shaft in the middle of the rocker arm in the length direction. However, because the force bearing point of the rocker arm 500 is located at the end fitting to the rotary pin 200, the rocker arm 500 sways with the shaft as a fulcrum in the actual operation (similar to a seesaw structure). The arrangement of the middle spring causes the rocker arm to shift or bounce in the direction that needs to be fixed (the radial direction of the shaft), causing ineffective rotation, extension, and retraction of the rotary pin 200. Moreover, the arrangement of the middle spring requires that the hole fitting with the rotating shaft is absolutely circular, causing the difficulty in the machining of the mounting box.

In the cap opening and closing device 1 according to the embodiment of the present disclosure, arranging the slidable pin 600 and the adjusting component 700 at the end of the rocker arm 500 that fits with the guide block 400, to prevent the rocker arm 500 from swaying or shifting in the axial direction of the axis of rotation, and not to increase the processing difficulty of the mounting box 100.

Figure 3:
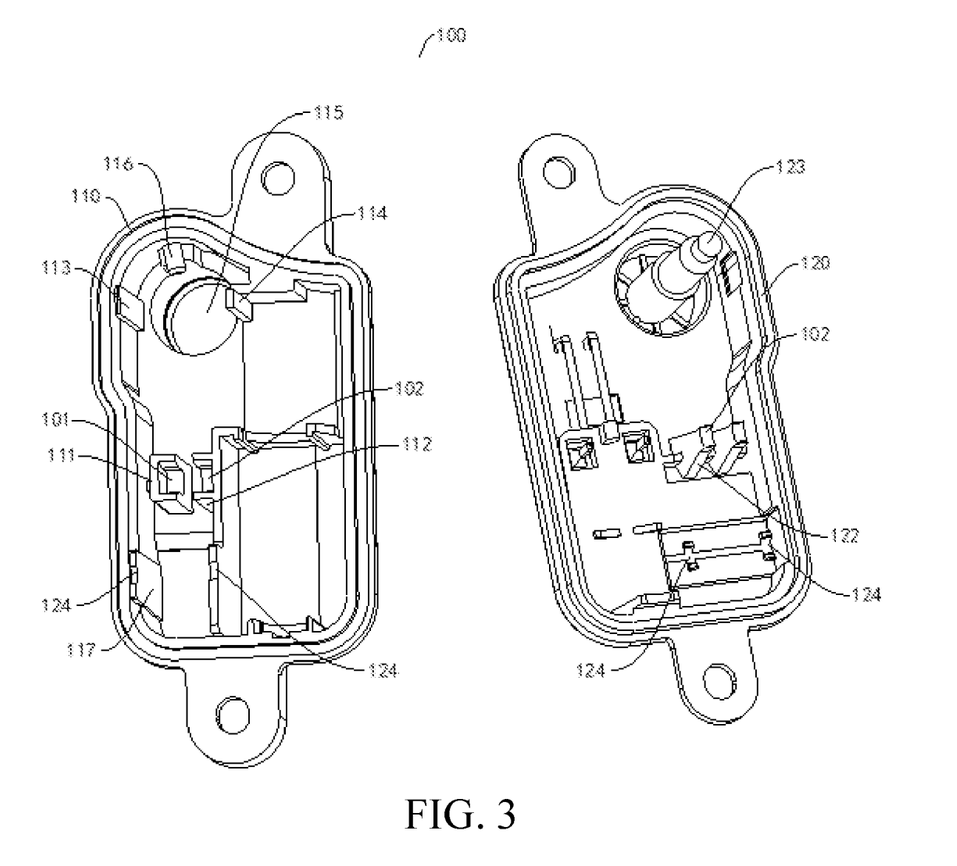
FIG. 3 is an exploded view of a mounting box of a cap opening and closing device according to an embodiment of the present disclosure.

In some embodiments of the present disclosure, as shown in FIG. 1 and FIG. 3, the mounting box 100 includes a box body 110 and a box cover 120.

One side of the box body 110 is provided with an opening. The rotary pin 200 is rotatably and retractably mounted to the box body 110. The box cover 120 is mounted to the box body 110 and covers the opening. One end of the first elastic component 300 abuts against the rotary pin 200 and the other end abuts against the box cover 120. Both the guide block 400 and the rocker arm 500 are mounted to the box body 110 and the box cover 120. That is, the box body 110 and the box cover 120 are jointly provided with the guide block 400 and the rocker arm 500. As such, the mounting box 100 has a split structure, to facilitate the overall disassembly and assembly of the cap opening and closing device 1.

In some embodiments of the present disclosure, as shown in FIG. 3, the box body 110 of the mounting box 100 is provided with a guide hole 115, the rotary pin 200 is fitted to the guide block 400, and the rotary pin 200 is retractable through the guide hole 115 and rotatable in the guide hole 115, to ensure the stability in the movement of the rotary pin 200, and facilitating the fitting with the cap.

In an embodiment, as shown in FIG. 1 and FIG. 3, the rotary pin 200 is provided with a spiral guide groove 230, and the spiral guide groove 230 extends spirally on an outer peripheral surface of the rotary pin 200. The box body 110 of the mounting box 100 is provided with a pin pole 116, where the pin pole 116 fits to the spiral guide groove 230 and transforms the telescopic motion of the rotary pin 200 into a rotary motion. In other words, the fitting of the pin pole 116 with the spiral guide groove 230 may combine the telescopic motion and the rotary motion of the rotary pin 200. That is, the extension and retraction of the rotary pin 200 is accompanied by the rotation of itself, thereby driving the locking head 210 to rotate, and to lock and unlock the cap.

Figure 2:
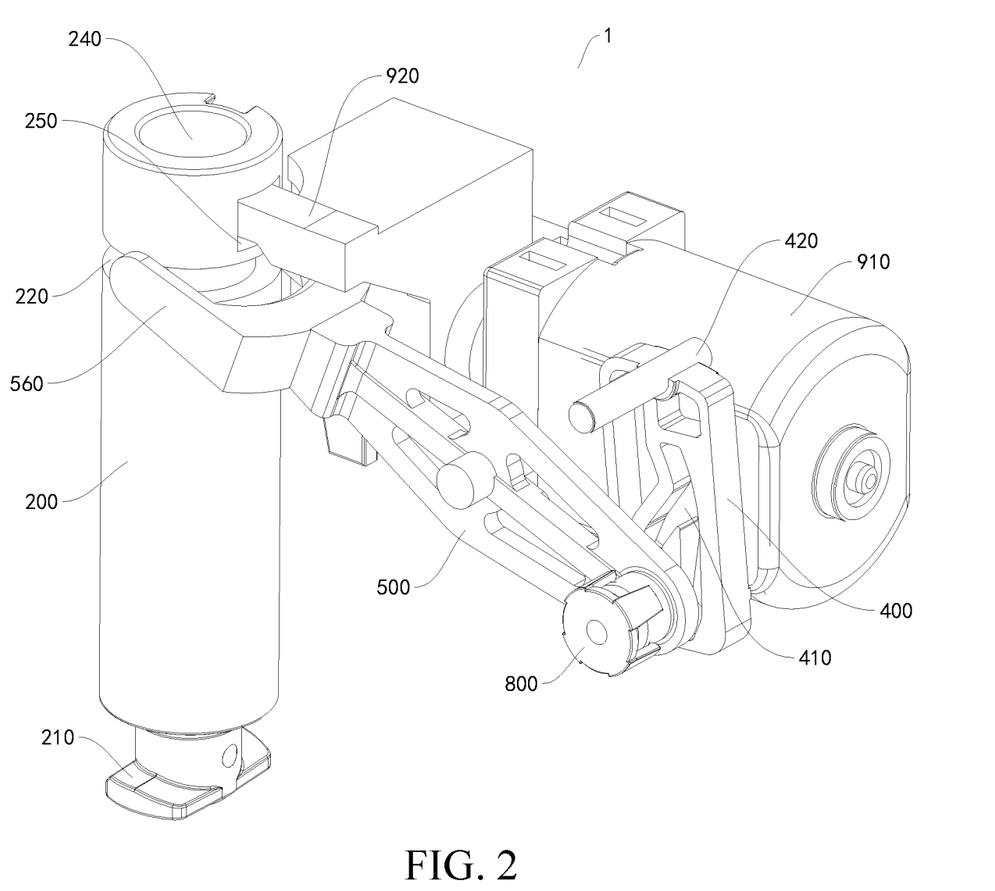
FIG. 2 is a schematic of the partial structural view of a cap opening and closing device according to an embodiment of the present disclosure.

In some embodiments of the present disclosure, as shown in FIG. 1 to FIG. 3, one end of the rotary pin 200 facing the box cover 120 is provided with a hollow hole 240, and the box cover 120 of the mounting box 100 is provided with a mounting post 123. The first elastic component 300 is a spring, one end of the first elastic component 300 is fitted in the hollow hole 240, and the other end of the first elastic component 300 is mounted around the mounting post 123, to fix the two ends of the first elastic component 300, so that the elastic force of the first elastic component 300 can stably push the rotary pin 200 out.

In some embodiments of the present disclosure, the adjusting component 700 includes a second elastic component that pushes the slidable pin 600 toward the guide groove 410. Through the elastic force of the second elastic component, the reciprocating sliding of the slidable pin 600 in its axial direction is enabled to drive the slidable pin 600 to slide along the guide groove 410, to fit the slidable pin 600 to the guide groove 410, and the movement of the slidable pin 600 will not drive the rocker arm 500 to shift or sway in the axial direction of the axis of rotation.

Figure 5:
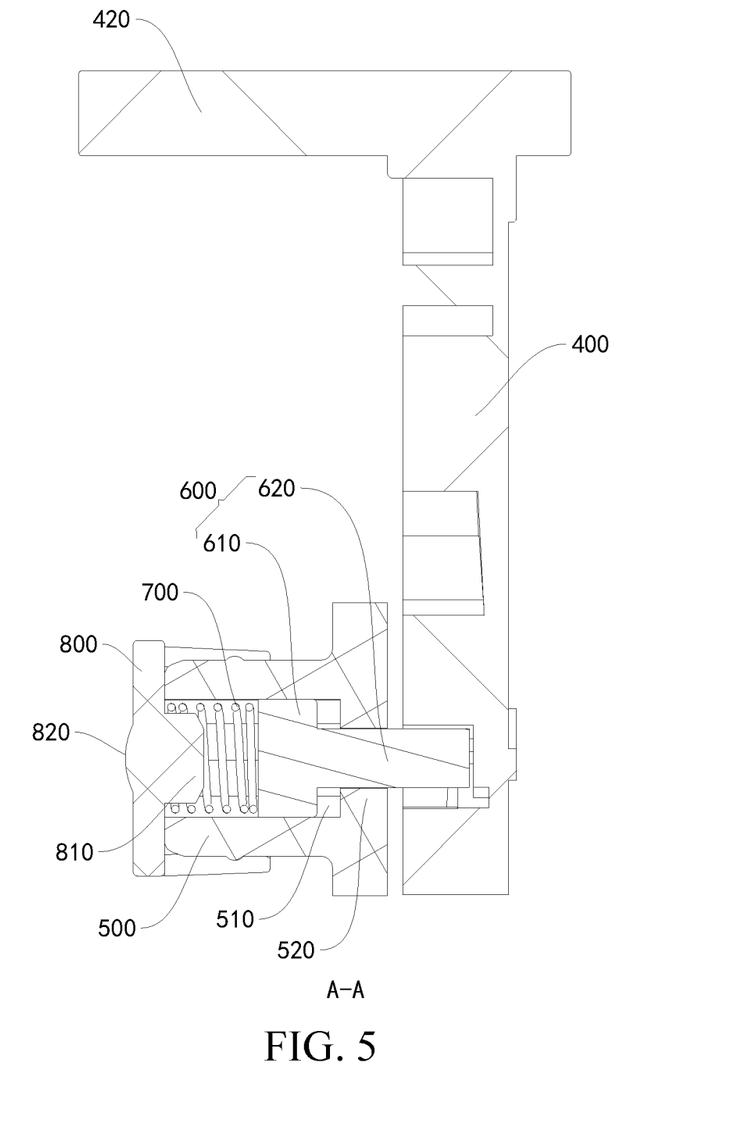

In an embodiment, as shown in FIG. 5, the slidable pin 600 includes a pin cap 610 and a pin pole 620. One end of the pin pole 620 is connected to the pin cap 610, the cross-sectional area of the pin pole 620 is smaller than the cross-sectional area of the pin cap 610, and the other end of the pin pole 620 is fitted to the guide groove 410 and is slidable along the guide groove 410. In an embodiment, one end of the pin hole 510 facing the guide block 400 is structured with a step 520, and the pin cap 610 abuts against the step 520 with the push of the second elastic component (that is, the adjusting component 700).

Therefore, on the one hand, the contact area between the second elastic component and the slidable pin 600 is increased, to allow for more uniform and stable force transmission; and on the other hand, the step 520 and the pin cap 610 form a stop, to prevent the slidable pin 600 from getting out of the pin hole 510 in a direction toward the guide block 400.

Figure 4:
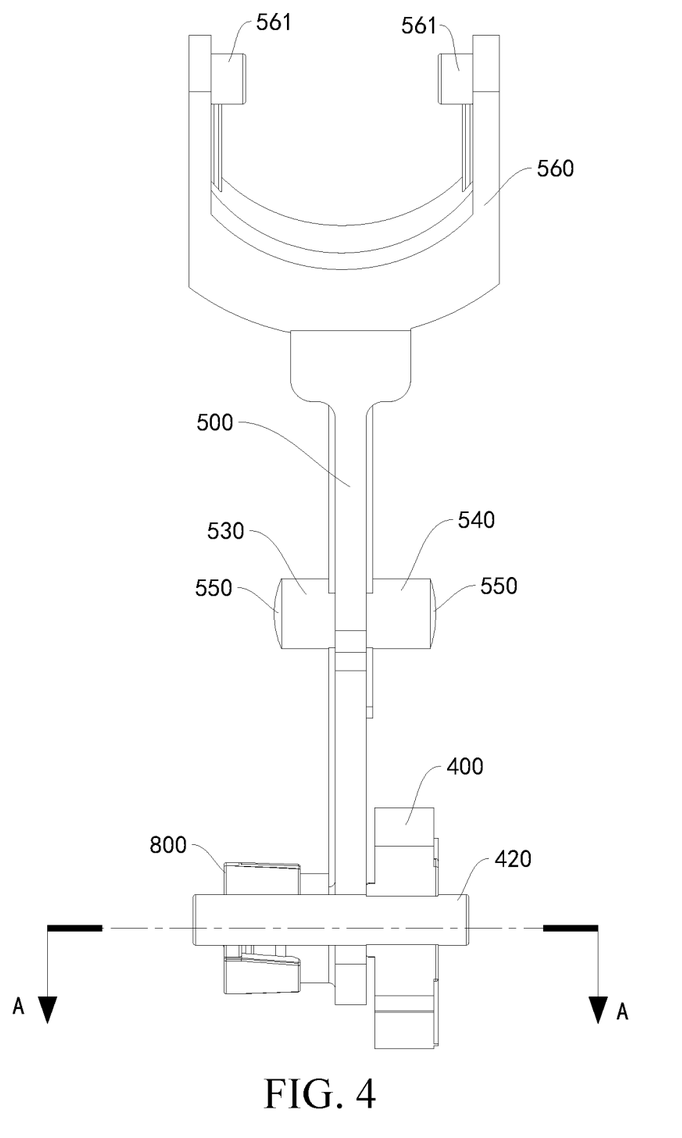
FIG. 4 is a schematic of the view showing a rocker arm fitting with a guide block of a cap opening and closing device according to an embodiment of the present disclosure.

In some embodiments of the present disclosure, as shown in FIG. 1, FIG. 4 and FIG. 5, the cap opening and closing device 1 further includes an end cover 800.

The end cover 800 is mounted to the other end of the rocker arm 500, and the end cover 800 covers the end of the pin hole 510 facing away from the guide block 400. For example, the end cover 800 is mounted to the rocker arm 500 by a buckle structure, the second elastic component is arranged in the pin hole 510, one end of the second elastic component abuts against the end cover 800 and the other end abuts against the pin cap 610 of the slidable pin 600.

In an embodiment, as shown in FIG. 5, the surface of the end cover 800 facing the second elastic component is provided with a positioning protrusion 810, and the positioning protrusion 810 extends into the pin hole 510. The second elastic component is a spring, and one end of the second elastic component is mounted around the positioning protrusion 810, to fix the second elastic component, and ensure the stability of the force.

In an embodiment, as shown in FIG. 5, the surface of the end cover 800 facing away from the second elastic component is provided with a first spherical surface 820, and a stop plate 117 is provided in the box body 110 of the mounting box 100, where the first spherical surface 820 abuts against the stop plate 117, to limit the movement of the second elastic component in the axial direction, and eliminate the swaying of the rocker arm 500 caused by the reaction force of the second elastic component, thus further enhancing the stability of the rocker arm 500.

In some embodiments of the present disclosure, the rocker arm 500 is an integral rigid component formed, for example, by integral injection molding of plastics, which has simple structure, is easy to produce and process, and is maintained stable. Definitely, it can also be integrally formed by a metal member, which is easy to process and has stable structure as well.

In some cap opening and closing devices in related art, the end of the rocker arm that is fitted to the guide block is arranged to have a flexible structure, and the end of the rocker arm that is fitted to the rotary pin is arranged to have a rigid structure. In this case, the flexible structure is difficult to process, and the rocker arm is always in a state of deformation due to the essential mechanical support, raising a high requirement for the selection of materials. Moreover, the rigid end of the rocker arm will always bear a reaction force that alternates repeatedly (the magnitude of the force varies), causing the rocker arm to shift or sway in the direction that needs to be fixed (the radial direction of the rotating shaft). As a result, the rotary pin cannot rotate, extend and retract effectively.

In the cap opening and closing device 1 according to the embodiment of the present disclosure, the rocker arm 500 with an integral rigid structure is used in combination with the slidable pin 600 and the adjusting component 700, which eliminates the swaying and shift of the rocker arm 500 in the axial direction of the axis of rotation, is easy to process, and has low requirements for the materials.

In some embodiments of the present disclosure, as shown in FIG. 1 to FIG. 4, the rocker arm 500 is respectively provided with a first rotating shaft 530 and a second rotating shaft 540 at two sides of a middle portion in the length direction, and the central axis of the first rotating shaft 530 coincides with the central axis of the second rotating shaft 540 and is perpendicular to the extension and retraction direction of the rotary pin 200. The mounting box 100 is provided with a first shaft hole 101 and a second shaft hole 102, where the first rotating shaft 530 is rotatably fitted in the first shaft hole 101, and the second rotating shaft 540 is rotatably fitted in the second shaft hole 102, to rotatably mount the rocker arm 500 to the mounting box 100.

As shown in FIG. 4, the end of the first rotating shaft 530 facing away from the rocker arm 500 and the end of the second rotating shaft 540 facing away from the rocker arm 500 are respectively provided with a second spherical surface 550. The second spherical surface 550 of the first rotating shaft 530 and the second spherical surface 550 of the second rotating shaft 540 abut against the mounting box 100, respectively. Therefore, the rocker arm 500 can be positioned in the axial direction of the first rotating shaft 530 and the second rotating shaft 540, to further prevent the rocker arm 500 to sway in the axial direction of the axis of rotation.

In an embodiment, as shown in FIG. 3, one of two opposite side walls of the mounting box 100 is provided with a first mounting seat 111 and a second mounting seat 112, and the other is provided with a first mounting arm 121 and a second mounting arm 122. For example, the first mounting seat 111 and the second mounting seat 112 are provided on the box body 110, and the first mounting arm 121 and the second mounting arm 122 are provided on the box cover 120. The first mounting arm 121 and the first mounting seat 111 together define the first shaft hole 101, and the second mounting arm 122 and the second mounting seat 112 together define second shaft hole 102. The second spherical surface 550 of the first rotating shaft 530 abuts against the first mounting seat 111, and the second spherical surface 550 of the second rotating shaft 540 abuts against the second mounting seat 112.

In some embodiments of the present disclosure, as shown in FIG. 1, FIG. 2, and FIG. 4, the one end of the rocker arm 500 is provided with a fork-shaped head 560, and the fork-shaped head 560 is provided with oppositely arranged guide posts 561. An outer peripheral surface of the rotary pin 200 is provided with an annular groove 220 extending circumferentially, and the guide post 561 is fitted in the annular groove 220. Therefore, when the rotary pin 200 is extended and retracted, the rocker arm 500 is driven to sway about its axis of rotation, and the fork-shaped head 560 and the rotary pin 200 are formed to be rotatably fitted in two directions. In one direction, the fork-shaped head 560 can rotate relative to the rotary pin 200 around the axial direction of the guide post 561, and in the other direction, the rotary pin 200 can rotate relative to the fork-shaped head 560 around its own axial direction. Therefore, the fitting of the fork-shaped head 560 and the rotary pin 200 will not hinder the extension, retraction and rotation of the rotary pin 200 itself.

In an embodiment, as shown in FIG. 3, a first stopper 113 and a second stopper 114 are provided in the box body 110 of the mounting box 100, and the first stopper 113 and the second stopper 114 can be oppositely arranged in the radial direction of the guide hole 115. The fork-shaped head 560 is located between the first stopper 113 and the second stopper 114, to prevent the fork-shaped head 560 of the rocker arm 500 from swaying in the radial direction of the rotary pin 200.

In some embodiments of the present disclosure, as shown in FIG. 1 to FIG. 3, the guide block 400 is provided with a support shaft 420, and mounting box 100 is provided with a support shaft hole 124, where the support shaft 420 is fitted in the support shaft hole 124. As such, the guide block 400 is rotatably mounted to the mounting box 100.

For example, the support shaft hole 124 includes two parts respectively provided on the box body 110 and the box cover 120, and a complete support shaft hole 124 is formed after the box body 110 and the box cover 120 are assembled.

Figure 6:
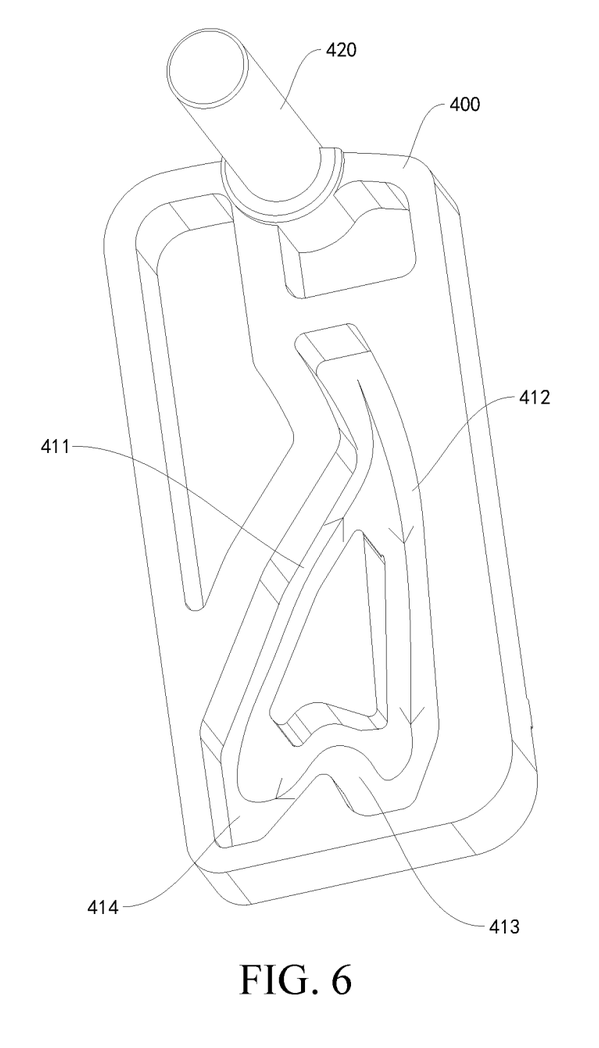
FIG. 6 is a schematic of the structural view of a guide block of a cap opening and closing device according to an embodiment of the present disclosure.

In some embodiments of the present disclosure, as shown in FIG. 6, the guide groove 410 has a closed annular structure, for example, an inverted heart shape. The slidable pin 600 can slide unidirectionally along the guide groove 410. The arrow in the guide groove 410 in FIG. 6 shows the unidirectional sliding direction of the slidable pin 600. Specifically, the guide groove 410 includes a first ascending section 411, a first descending section 412, a second ascending section 413, and a second descending section 414 connected in sequence. One end of the first ascending section 411 is connected to one end of the first descending section 412, and the distance between the first ascending section 411 and the first descending section 412 gradually increases toward the extending-out direction of the rotary pin 200. One end of the second ascending section 413 is connected to the other end of the first descending section 412, one end of the second descending section 414 is connected to the other end of the first ascending section 411, the other end of the second ascending section 413 is connected to the other end of the second descending section 414, and the distance between the second ascending section 413 and the second descending section 414 gradually increases toward the extending-out direction of the rotary pin 200. Therefore, by arranging the guide groove 410 of the above shape, the reciprocating sliding of the slidable pin 600 in its axial direction is enabled to drive the slidable pin 600 to slide along the guide groove 410 through the elastic force of the second elastic component, so as to fit the slidable pin 600 to the guide groove 410. In other words, by limiting the extension and retraction of the rotary pin 200 by the rocker arm 500, a press type cap opening and closing device is formed. That is, the cap cannot be opened and closed by applying a pulling force.

For example, when the cap is in a closed position, the slidable pin 600 slides to a position between the second ascending section 413 and the second descending section 414, where a V-shaped structure is formed. The slidable pin 600 is pressed against the V-shaped structure by the adjusting component 700, and is in balance and unable to slide continuously. Only when the cap is pressed, the rotary pin 200 drives the slidable pin 600 to slide a short distance toward one side of the V-shaped structure (lower left in FIG. 6) through the rocker arm 500, and then the slidable pin 600 is forced by the first elastic component 300 to slide continuously, to reach an open position of the cap. In other words, when the cap is closed and a pulling force is applied to the cap, the slidable pin 600 is stopped by the V-shaped structure and unable to move, so the cap cannot be opened.

In some embodiments of the present disclosure, as shown in FIG. 1 and FIG. 2, the cap opening and closing device 1 further includes a motor 910 and a locking block 920.

The motor 910 is mounted to the box body 110 of the mounting box 100. The locking block 920 is in transmission connection with the motor 910, and the rotary pin 200 is provided with a locking groove 250, where the locking block 920 is driven by the motor 910 to move into and out of the locking groove 250. As such, when the cap is closed, the motor 910 can drive the locking block 920 to move into the locking groove 250 of the rotary pin 200. At this time, the rotary pin 200 cannot be rotated, extended, and retracted, to prevent the cap from being opened by mistake.

In an embodiment, the motor 910 is in transmission connection with the locking block 920 through a screw 930. The screw 930 transforms the rotary motion of a motor shaft of the motor 910 into the linear motion of the locking block 920, to save space in the mounting box 100, and thus reduce the volume of the cap opening and closing device 1.

A vehicle according to an embodiment of the present disclosure is described with reference to FIG. 7 to FIG. 10 below.

Figure 7:
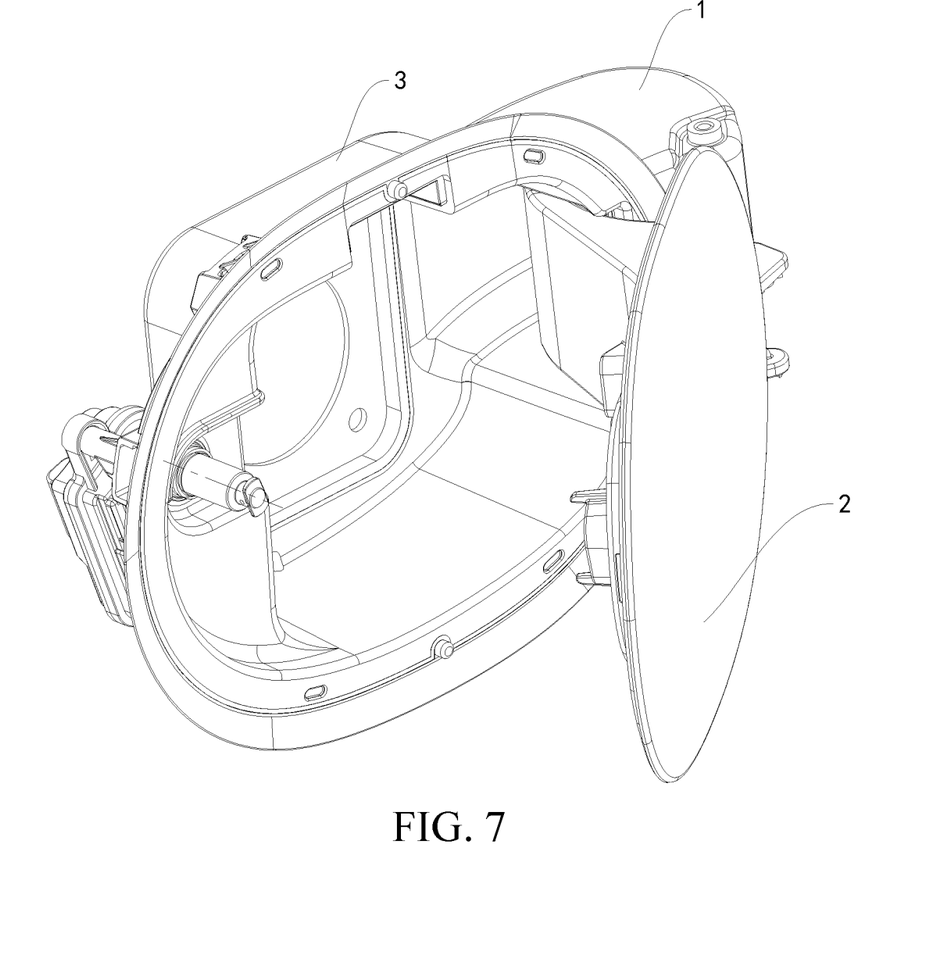
FIG. 7 is a schematic of the three-dimensional view showing a cap fitting with a cap opening and closing device according to an embodiment of the present disclosure, where the cap is open.
Figure 8:
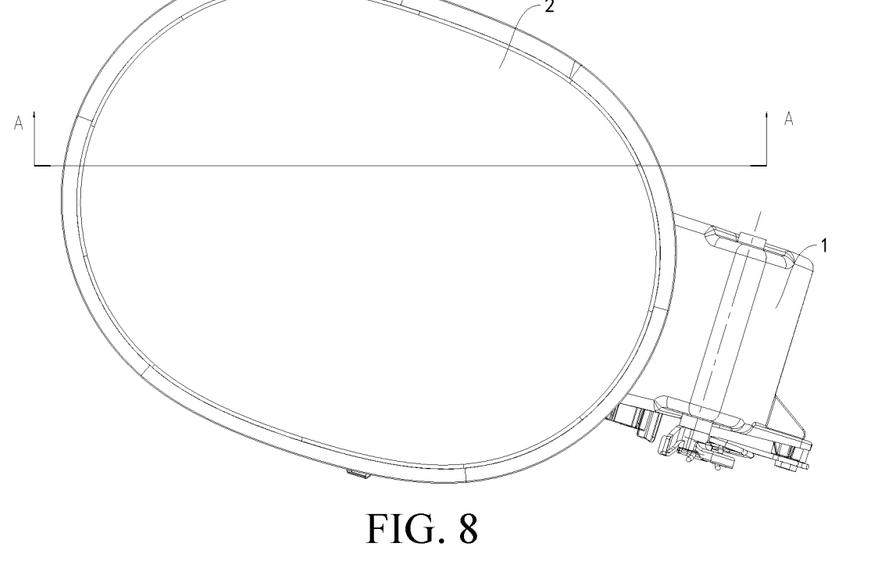
FIG. 8 is a schematic of the top view showing a cap fitting with a cap opening and closing device according to an embodiment of the present disclosure, where, the cap is closed.

As shown in FIG. 7 and FIG. 8, the vehicle according to the embodiment of the present disclosure includes a cap 2 and the cap opening and closing device 1 according to the above-mentioned embodiment of the present disclosure. The cap 2 can be provided on an open box 3 with an open one end, where the open box 3 can be a fuel tank and/or a charging box of the vehicle. Namely, the cap may be a fuel tank cap, and/or a charging port cap. In other words, the cap opening and closing device 1 is applicable to a fuel tank cap, or a charging port cap. For hybrid vehicles and other vehicles, both the fuel tank cap and the charging port cap can use the cap opening and closing device 1 according to the embodiment of the present disclosure.

Figure 9:
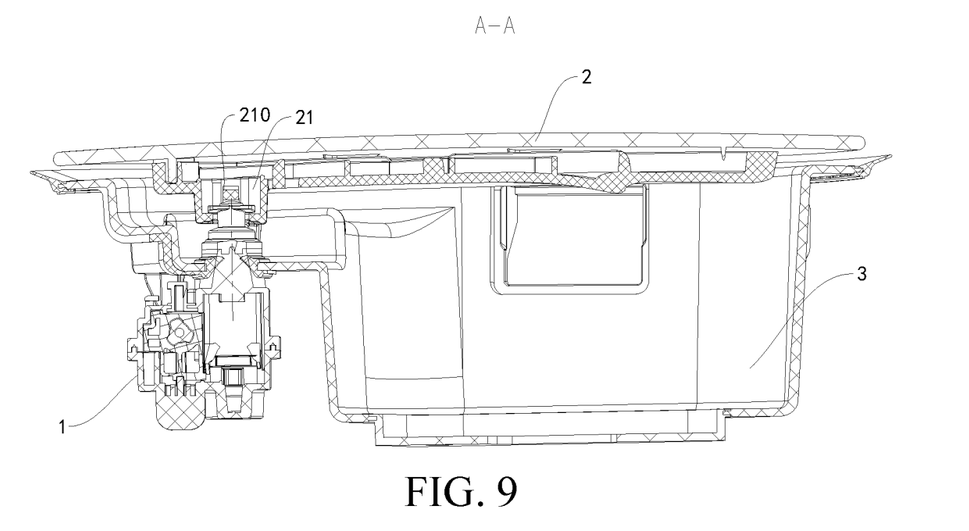
FIG. 9 is a schematic of the cross-sectional view taken along A-A in FIG. 8.
Figure 10:
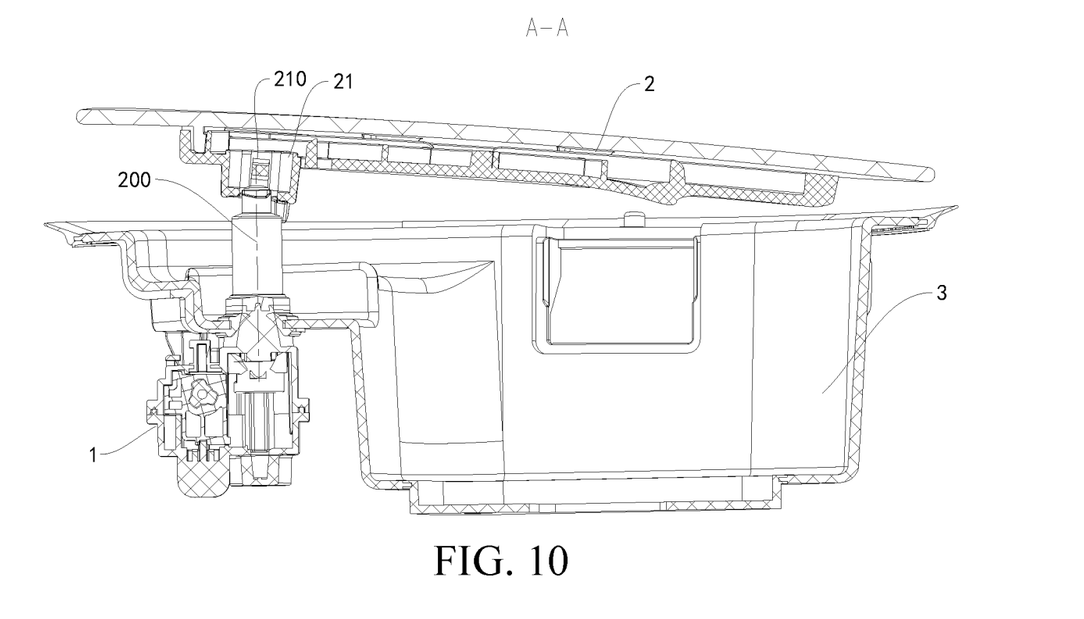
FIG. 10 is a schematic of the cross-sectional view taken along A-A in FIG. 8 where the cap is open.

Specifically, referring to FIG. 9 and FIG. 10, a locking groove 21 is provided on the cap 2, where the locking head 210 provided at one end of the rotary pin 200 can be movably fitted in the locking groove 21, to movably connect the cap opening and closing device 1 to the cap 2. As such, when an external force is applied, the cap 2 on the open box 3 can be opened and closed by the rotary and telescopic motion of the rotary pin 200 in the mounting box 100. In an embodiment, the locking groove 21 is a square groove.

The vehicle according to the embodiment of the present disclosure has the advantages of the reliable performance of cap opening and closing by utilizing the cap opening and closing device 1 according to the embodiment of the present disclosure.

Other components and operations of the vehicle according to the embodiment of the present disclosure are known to those of ordinary skill in the art and will not be described in detail here again.

In the description of the present disclosure, description of reference terms such as "a specific embodiment" or "a specific example", means including specific features, structures, materials, or features described in the embodiment or example in at least one embodiment or example of the present disclosure. In the present disclosure, schematic descriptions of the foregoing terms do not necessarily refer to a same embodiment or example.

Although the embodiments of the present disclosure are already shown and described, a person of ordinary skill in the art may understand that various changes, modifications, replacements and variations may be made to the embodiments without departing from the principles and spirit of the present disclosure, and the scope of the present disclosure is as defined by the appended claims and their equivalents.

What is claimed is:

1. A device for opening and closing a cap, comprising:
   a mounting box;
   a locking pin, rotatably and retractably mounted to the mounting box, and having a locking head for hooking the cap;
   a guide block, mounted to the mounting box and having a guide groove;
   a rocker arm, rotatably mounted to the mounting box, and having a first end fitted to the locking pin and a second end fitted with a pin hole;
   a slidable pin, movably fitted in the pin hole along an axial direction of the pin hole; and
   an adjusting component, arranged on the second end of the rocker arm and abutting against the slidable pin, and configured to adjust a position of the slidable pin in the pin hole, wherein the slidable pin is coupled with the adjusting component to fit to the guide groove and to slide along the guide groove.

2. The device according to claim 1, wherein the guide groove has a groove bottom with concave and convex portions, and the slidable pin is coupled with the adjusting component to fit to the groove bottom of the guide groove.

3. The device according to claim 1, wherein the adjusting component comprises a second elastic component configured to push the slidable pin toward the guide groove.

4. The device according to claim 3, wherein the slidable pin comprises
   a pin cap; and
   a pin pole, wherein one end of the pin pole is connected to the pin cap, a cross-sectional area of the pin pole is smaller than a cross-sectional area of the pin cap, and the other end of the pin pole is fitted to the guide groove and is slidable along the guide groove.

5. The device according to claim 4, wherein the pin hole comprises a step, and the pin cap abuts against the step by a push of the second elastic component.

6. The device according to claim 3, further comprising
   an end cover, wherein the end cover is mounted to the second end of the rocker arm and covers the pin hole, the second elastic component is arranged in the pin hole, and a first end of the second elastic component abuts against the end cover and a second end of the second elastic component abuts against the slidable pin.

7. The device according to claim 6, wherein the end cover comprises a positioning protrusion facing the second elastic component, and the first end of the second elastic component is mounted around the positioning protrusion.

8. The device according to claim 6, wherein a surface of the end cover facing away from the second elastic component is provided with a first spherical surface, a stop plate is provided in the mounting box, and the first spherical surface abuts against the stop plate.

9. The device according to claim 1, wherein the rocker arm is an integral rigid component.

10. The device according to claim 1, wherein the rocker arm includes a first rotating shaft and a second rotating shaft at two sides of a middle portion in a length direction, the mounting box is provided with a first shaft hole and a second shaft hole, the first rotating shaft is rotatably fitted in the first shaft hole, and the second rotating shaft is rotatably fitted in the second shaft hole.

11. The device according to claim 10, wherein each of an end of the first rotating shaft facing away from the rocker arm and an end of the second rotating shaft facing away from the rocker arm includes a second spherical surface, and the second spherical surface of the first rotating shaft and the second spherical surface of the second rotating shaft abut against the mounting box.

12. The device according to claim 11, wherein a first side wall of two opposite side walls of the mounting box includes a first mounting seat and a second mounting seat, and a second side wall of the two opposite side walls includes a first mounting arm and a second mounting arm; the first mounting arm and the first mounting seat together define the first shaft hole, and the second mounting arm and the second mounting seat together define the second shaft hole; and the second spherical surface of the first rotating shaft abuts against the first mounting seat, and the second spherical surface of the second rotating shaft abuts against the second mounting seat.

13. The device according to claim 1, wherein the locking pin comprises:
   a rotary pin, rotatably and retractably mounted to the mounting box; and
   a first elastic component, configured to push the rotary pin to extend out of the mounting box.

14. The device according to claim 13, wherein the first end of the rocker arm includes a fork-shaped head, the fork-shaped head includes oppositely arranged guide posts, an outer peripheral surface of the rotary pin includes an annular groove extending circumferentially, and the guide posts are fitted in the annular groove.

15. The device according to claim 14, wherein a first stopper and a second stopper are provided in the mounting box, and the fork-shaped head is located between the first stopper and the second stopper.

16. The device according to claim 1, wherein
   the guide groove comprises a closed annular structure, and the slidable pin slides unidirectionally along the guide groove;
   the guide groove comprises a first ascending section, a first descending section, a second ascending section, and a second descending section connected in sequence, wherein a first end of the first ascending section is connected to a first end of the first descending section, and a distance between the first ascending section and the first descending section gradually increases toward an extending direction of the locking pin; and
   a first end of the second ascending section is connected to a second end of the first descending section, a first end of the second descending section is connected to a second end of the first ascending section, a second end of the second ascending section is connected to a second end of the second descending section, and a distance between the second ascending section and the second descending section gradually increases toward an extending direction of the locking pin.

17. The device according to claim 1, wherein the mounting box comprises
   a box body, wherein the locking pin is rotatably and retractably mounted to the box body; and
   a box cover, mounted to the box body, wherein a first end of a first elastic component abuts against the locking pin and a second end of the first elastic component abuts against the box cover, and both the guide block and the rocker arm are mounted to the box body and the box cover.

18. The device according to claim 7, wherein the second elastic component is a spring.

19. A vehicle, comprising:
   a cap, having a locking groove thereon; and
   a device for opening and closing the cap, wherein the device comprises:
   a mounting box;
   a locking pin, rotatably and retractably mounted to the mounting box, and having a locking head for hooking the cap, the locking head being movably fitted to the locking groove to connect the device to the cap;
   a guide block, mounted to the mounting box and having a guide groove;
   a rocker arm, rotatably mounted to the mounting box, and having a first end fitted to the locking pin and a second end fitted with a pin hole;
   a slidable pin, movably fitted in the pin hole along an axial direction of the pin hole; and
   an adjusting component, arranged on the second end of the rocker arm and abutting against the slidable pin, and configured to adjust a position of the slidable pin in the pin hole, wherein the slidable pin is coupled with the adjusting component to fit to the guide groove and to slide along the guide groove.

20. The vehicle according to claim 19, wherein the cap comprises a fuel tank cap, a charging port cap, or a combination thereof.

* * * * *